April 15, 1930.    C. D. PETERSON    1,755,020
ELECTRIC CONTROL FOR REDUCING VALVES, ETC
Filed Oct. 3, 1928
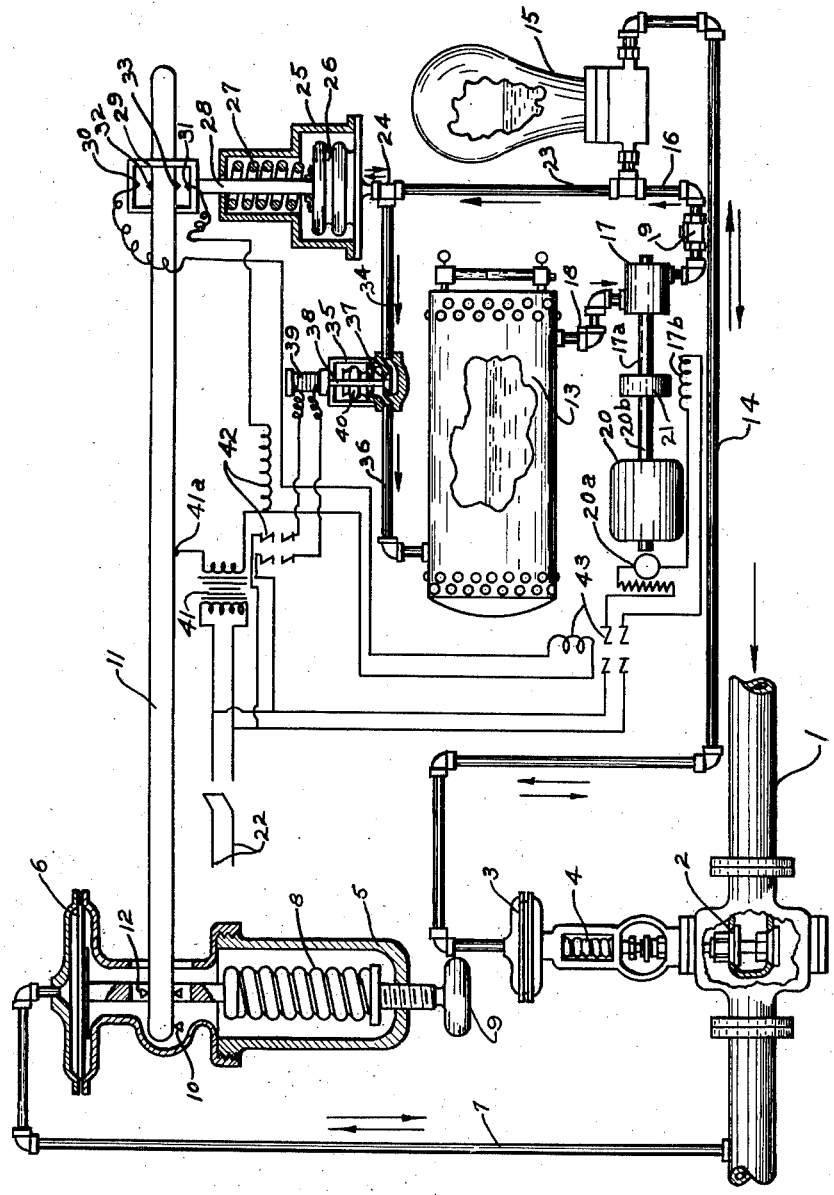
INVENTOR
Charles D. Peterson,
BY
George A. Prevost
ATTORNEY Patented Apr. 15, 1930

1,755,020

UNITED STATES PATENT OFFICE

CHARLES D. PETERSON, OF MARSHALLTOWN, IOWA, ASSIGNOR TO THE FISHER GOVERNOR COMPANY, OF MARSHALLTOWN, IOWA

ELECTRIC CONTROL FOR REDUCING VALVES, ETC.

Application filed October 3, 1928. Serial No. 310,153.

My invention consists in new and useful improvements in electric control units for reducing valves, relief valves and the like, and has for its object to provide a structure which will maintain a definite reduced pressure on the discharge side of the main valve of a steam, oil, gas, water or other pipe line.

A further object of my invention is to provide an extremely sensitive control for the main valve, whereby a slight variation in reduced pressure will instantly be transmitted to the main valve, thus causing the same to either open or close, to meet the change in reduced pressure. An electric source of current supply is employed as a pilot operating medium for actuating the entire mechanism, and it will be noted that the electric current may be either alternating or direct, and at various voltages, according to the particular installation conditions.

In short, my improved system of control consists of several units which, when combined together, give the regulation or movement to a main valve, which in turn regulates the medium being throttled.

With the above and other objects in view which will appear as the description proceeds, my invention consists in the novel features herein set forth, illustrated in the accompanying drawing, and more particularly pointed out in the appended claims.

Referring to the drawing, which is more or less diagrammatic or schematic in form, the complete assembly of parts and electrical wiring and connections, will be seen.

In the drawing, 1 represents a pipe line for steam, oil, gas, water, air or other fluids, which is provided with a reducing valve 2 for controlling the pressure of the fluid passing through the pipe line. This valve 2 is connected to, and actuated by the diaphragm 3, opening with the application of pressure to said diaphragm, as will be hereinafter described more in detail. Opposing the pressure on said diaphragm 3, is a compression spring 4, which is compressed as pressure is applied to said diaphragm, and which expands as the pressure is released to return the valve 2 to its closed position.

5 designates an auxiliary control unit adapted to receive the reduced pressure impulses which originate on the discharge side of the main valve 2, and which consists of a diaphragm 6 in communication with the pipe line 1 on the discharge side of the valve 2, by means of a control pressure pipe 7. The downward pressure on the diaphragm 6 is opposed by a compression spring 8, which is adjustable for the desired reduced pressure, by means of the adjustable screw 9. Pivoted at 10, within the auxiliary control unit 5, is an elongated lever 11, the vertical movement of which is controlled by the diaphragm 6, and the spring 8, through the medium of an intermediate member 12, located between, and connected to said diaphragm 6 and compression spring 8, as clearly shown in the drawing. It will thus be seen that the downward pressure on the diaphragm 6, will cause the outer end of the lever 11 to move downwardly while a reduction in pressure on said diaphragm will permit the spring 8 to expand and move the outer end of said lever upwardly, for the purpose hereinafter set forth.

13 represents a storage or receiving tank for the liquid operating medium, which is delivered to, and returned from the diaphragm 3, and is in communication with the upper side of said diaphragm by means of the pipe line 14, leading from said diaphragm to an air chamber 15, which, in turn, is connected to the pipe 16, leading to the pressure side of a gear pump 17, the suction side of which is connected to said storage tank 13, by means of the pipe line 18. In the pipe line 16, intermediate the air chamber 15 and the gear pump 17, I provide a check valve 19 for preventing the return of the liquid pumped from the tank 13 into the pipe line. The air chamber 15 is employed both to cushion and to absorb any pressure shock that may originate from the pump 17, and contains air in its upper portion, which expands or contracts as the pressure decreases or increases.

20 represents a small series wound motor, which is directly connected to the gear pump 17 by a magnetic clutch 21. This motor is non-reversing, and derives its source of power supply from the electric operating circuit 22, said motor being shown in the drawing, both as an exterior view as at 20, and also with the schematic wiring diagram as at 20ª. The magnetic clutch 21, which disengages the motor shaft 20ᵇ from the gear pump shaft 17ª, is also shown both as an exterior view and with a schematic wiring diagram 17ᵇ, said clutch being adapted to connect said shafts of the motor and pump, only when there is a current supply driving said motor.

Adjacent the end of the pipe 16 which opens into the air chamber 15, and also in communication with said pipe and air chamber, is a pipe 23, terminating in a T-connection 24 at its upper end, at the top of which connection, is mounted a special pressure actuated floating switch mechanism 25. This switch mechanism consists of a flexible corrugated diaphragm 26, which is adapted to move upwardly with the increase of pressure on the inside thereof, from the pipe 23, and downwardly with the decrease of pressure on its inside. At the top of this diaphragm 26, I provide a compression spring 27, which is compressed as pressure is applied to the inside of the diaphragm. It is obvious that with a loss of pressure inside the diaphragm 26, this spring expands and forces the top of said diaphragm downwardly. 28 represents a stem which is rigidly connected to the top of the diaphragm 26, and extends upwardly through the center of the spring 27, terminating at its upper end in a floating switch yoke 29, which carries electric contacts 30 and 31. These contacts 30 and 31 open and close on contacts 32 and 33 respectively, which are mounted on the free end of the lever 11, which extends through said yoke 29.

It will be seen that the upward movement of the lever 11 closes contacts 30 and 32, while the downward movement of said lever closes contacts 31 and 33. After contacts 30 and 32 are closed, the application of pressure to the diaphragm 26, will cause said contacts to be separated, and the flow of current therethrough stopped, due to the upward movement of the stem 28 and the yoke 29, with the diaphragm 26. On the other hand, should contacts 31 and 33 be closed, a reduction of pressure on diaphragm 26 will cause said diaphragm to contract and separate said contacts.

In the horizontal opening of the T-connection 24, I connect a pipe 34, the other end of which is connected into the intake end of a solenoid operated valve 35, the discharge side of said valve being in communication with the tank 13, by means of the return pipe 36. This mechanism 35 comprises a single seated inverted type of inner valve 37, having an upwardly extending stem 38 which passes through the solenoid 39. In place of a stuffing box for the stem 38, I employ a corrugated bellows diaphragm 40, which surrounds said stem, as clearly shown in the drawing, and prevents the loss of operating fluid at this point. The solenoid 39 at the upper end of the valve stem 38, holds the inner valve 37 tightly closed, when there is no current applied to the solenoid, but with the application of the electric current to said solenoid, the valve is opened and the operating fluid under pressure is passed through the valve body into the pipe 36, and returned to the tank 13.

In order to obtain a low voltage through the contacts 30, 31, 32 and 33, the current from the source 22 is passed through a step-down transformer 41, one of the leads from the low voltage side of which is flexibly connected to the pivoted lever 11, as shown at 41ª. It is through this connection that the circuits are completed between either contacts 30 and 32, or contacts 31 and 33. This low voltage actuates a solenoid operated switch 42, when contacts 31 and 33 are closed, which in turn controls the full voltage electric power supply which actuates the solenoid of valve 35. With the passing of current through the solenoid of switch 42, the main power supply switch is closed and the solenoid valve 35 is opened. The breaking of contacts 31 and 33 allows switch 42 to open and cut off the current supply to valve 35. The closing of contacts 30 and 32 actuates a solenoid operating switch 43, to which also the full voltage power supply is passed.

By closing the switch 43, the motor 20 is started, and the magnetic clutch 21 connects the shafts 20ᵇ and 17ª of the motor 20 and gear pump 17, respectively, to operate said gear pump. The breaking of the contacts 30 and 32 permits the switch 43 to open and stop the motor 20, disengaging the magnetic clutch 21 and allowing the gear pump 17 to stop.

Having thus described the details of construction, and the arrangement of the different elements, the operation of my improved control is as follows.

The main valve 2 should be in a part way open position, sufficient to supply the necessary amount of medium passing therethrough, to maintain the reduced pressure on the discharge side of said valve at a predetermined value. With the decrease in discharge pressure applied to the diaphragm 6, through pipe 7, the lever 11 is raised by the compression spring 8, which upward movement closes the contacts 30 and 32, thus permitting the flow of low voltage currents through the solenoid of switch 43. This solenoid in turn closes the full voltage circuit and allows current to pass through the series field and armature of motor 20, 20ª.

The same current also passes through the actuating solenoid 17ᵇ of the magnetic clutch 21. The gear pump 17 is thus set into operation and draws through its suction line 18 a quantity of the operating fluid from the receiver tank 13, where it is maintained at atmospheric pressure, and discharges said fluid through the discharge pipe 16 and check valve 19, the latter preventing the backward flow of said operating fluid through the pump and into the receiver tank. As long as the operating fluid is discharged under pressure, this pressure is applied through the entire piping system to the diaphragm 3 of the main valve 2, and to the pressure chamber 15, the diaphragm 26, and the inlet side of the valve 35. It is obvious that an increase in pressure on the diaphragm 3, allows the valve 2 to start opening, said pressure increasing as long as the gear pump 17 is running.

As before stated, this increase in pressure acts upon the diaphragm 26, which in turn lifts the contact yoke 29 upwardly, and separates the contacts 30 and 32, which causes the switch 43 to open and stop the motor and gear pump. Should the pressure decrease again by a slight amount on diaphragm 6, the contacts 30 and 32 are again closed, and the gear pump delivers another increment of pressure, until the application of pressure on diaphragm 26 breaks the contacts 30 and 32 again, and stops the motor and gear pump.

It will be seen that in this way, the main valve 2 is opened gradually with a throttling action, as the pressure on diaphragm 6 decreases.

With an increase of discharge pressure on the diaphragm 6, contacts 31 and 33 are closed, due to the lever 11 being pulled downwardly, which actuates the switch 42 and applies full voltage current through the solenoid operating valve 35. This permits the inner valve 37 to open and pass a quantity of the operating medium from the pressure pipe 34 to the discharge pipe 36, from whence it is returned at atmospheric pressure to the receiver tank 13. As long as the valve 35 is open, the pressure decreases inside of the diaphragm 26, which in time will insure the contacts 31 and 33 being separated to break the circuit and allow the switch 42 to open and turn off the current passing through the solenoid of valve 35, which in turn permits the inner valve 37 to close and stop the flow of liquid therethrough. Should the pressure increase by an additional increment, the lever 11 will again drop and close the contacts 31 and 33, thus opening the valve 35 again, and repeating the cycle until the diaphragm 26 again breaks the contact.

It will be noted that my improved system may be applied to numerous different types of mechanism, with slight changes in structure. For instance, if it were to be applied to a relief valve, the main valve 2 would be fitted with a vertical type of inner valve which would close with the application of pressure on the diaphragm 3.

If the system were applied to a float controlling mechanism, a suitable float arrangement would be substituted for the unit 5. For temperature, humidity, electric switch operation, and other control, it would only be necessary to eliminate the unit 5, and properly connect the temperature controlling, humidity controlling, or electric switch, mechanism to the lever 11.

From the foregoing, it is believed that my invention may be clearly understood by those skilled in the art without further description, it being borne in mind that numerous changes may be made in the details of construction, without departing from the spirit of the invention, as set forth in the following claims.

What I claim and desire to secure by Letters Patent is:

1. A pipe line for conveying a fluid under pressure, a valve for regulating the flow of fluid through said line, an actuating member for said valve, a chamber communicating with said pipe line, posterior to said valve, a second actuating member arranged in said chamber, means including a closed fluid circuit for pumping a fluid operating medium to said first mentioned actuating member for operating said valve, and means operated by said second actuating member for controlling said pumping means.

2. A pipe line for conveying a fluid under pressure, a valve for regulating the flow of fluid through said line, a diaphragm for actuating said valve, a chamber communicating with the pipe line posterior to said valve, a second diaphragm arranged in said chamber, means including a closed fluid circuit for pumping a fluid operating medium to the first mentioned diaphragm for actuating the latter, and means actuated by the second diaphragm for controlling said pumping means.

3. A pipe line for conveying a fluid under pressure, a valve for regulating the flow of fluid through said line, a diaphragm for actuating said valve, a chamber communicating with the pipe line posterior to said valve, a second diaphragm arranged in said chamber, means including a closed fluid circuit for pumping a fluid operating medium to the first mentioned diaphragm for actuating the latter, and means actuated by the second diaphragm for controlling said pumping means, said last mentioned means including electrically operated elements.

4. A pipe line for conveying a fluid under pressure, a valve for regulating the flow of fluid through said line, a diaphragm for actuating said valve, a chamber communicating with the pipe line posterior to said valve, a second diaphragm arranged in said chamber, means including a closed fluid circuit for pumping a fluid operating medium to the first mentioned diaphragm for actuating the latter, and means actuated by the second diaphragm for controlling said pumping means, said last mentioned means including electrically operated elements, some of which form circuit making and breaking means, and pressure actuated means for shifting at least one of the parts of said circuit making and breaking means.

5. A pipe line for conveying a fluid under pressure, a valve for regulating the flow of fluid through said line, a diaphragm for actuating said valve, a tank containing a fluid operating medium, in communication with said diaphragm, means for pumping said medium to said diaphragm for actuating said valve, a chamber communicating with said pipe line posterior to said valve, a second diaphragm in said chamber, means actuated by said second diaphragm for controlling the operation of said pumping means and means for returning the operating medium to said tank.

6. Apparatus as claimed in claim 5 wherein said last named means is controlled by an electrically operated valve.

7. Apparatus as claimed in claim 5 wherein said means for controlling the pump comprises a fulcrumed lever actuated by said second diaphragm, said lever being in communication with a source of electric supply, and circuit making and breaking means on the free end of said lever.

8. Apparatus as claimed in claim 5 wherein said means for controlling the pump, comprises a fulcrumed lever actuated by said second diaphragm, said lever being in communication with a source of electric supply, and circuit making and breaking means on the free end of said lever, said last named means comprising a plurality of contact points on said lever, and a pressure controlled floating switch yoke for making and breaking the circuits with said contact points, the movement of said yoke being controlled by the pressure in the line conveying the operating medium.

9. Apparatus as claimed in claim 5 including an electrically operated pump for said operating medium, an electrically operated valve for controlling the return of said medium, both of the circuits for said electrically actuated elements being controlled by a common means.

In testimony whereof I affix my signature.

CHARLES D. PETERSON.